United States Patent

Honda et al.

[11] Patent Number: 5,667,545
[45] Date of Patent: Sep. 16, 1997

[54] FILTER ELEMENT FOR AIR CLEANER AND METHOD OF MANUFACTURING THE SAME

[75] Inventors: Minoru Honda, Kariya; Hideki Inaba, Gifu, both of Japan

[73] Assignees: Toyoda Boshoku Corporation; Nippondenso Co., Ltd., both of Japan

[21] Appl. No.: 670,288

[22] Filed: Jun. 26, 1996

[30] Foreign Application Priority Data

Jul. 3, 1995 [JP] Japan .................. 7-167365

[51] Int. Cl.⁶ .................. B01D 27/06; B01D 46/10
[52] U.S. Cl. .................. 55/497; 55/502; 55/521; 55/DIG. 5
[58] Field of Search .................. 55/497, 500, 502, 55/511, 521, DIG. 5

[56] References Cited

U.S. PATENT DOCUMENTS

| | | | |
|---|---|---|---|
| 2,048,911 | 7/1936 | Zimmerman | 55/497 X |
| 3,144,315 | 8/1964 | Hunn | 55/500 X |
| 3,747,772 | 7/1973 | Brown | 55/521 X |
| 3,999,964 | 12/1976 | Carr | 55/521 X |
| 4,636,231 | 1/1987 | Thornton et al. | 55/497 X |
| 4,701,197 | 10/1987 | Thornton et al. | 55/521 X |
| 4,725,296 | 2/1988 | Kurotobi | 55/497 |
| 4,826,517 | 5/1989 | Norman | 55/502 X |
| 4,925,469 | 5/1990 | Clement et al. | 55/497 X |
| 5,288,300 | 2/1994 | Müller et al. | 55/497 |
| 5,501,794 | 3/1996 | Van de Graaf et al. | 55/497 X |
| 5,505,603 | 4/1996 | Baracchi et al. | 55/DIG. 5 |
| 5,509,950 | 4/1996 | Van de Graaf et al. | 55/497 X |
| 5,531,892 | 7/1996 | Duffy | 55/497 X |
| 5,554,205 | 9/1996 | Ernst et al. | 55/497 X |

FOREIGN PATENT DOCUMENTS

| | | | |
|---|---|---|---|
| 4323523 | 1/1995 | Germany | 55/497 |
| 56-017223 | 4/1981 | Japan | 55/497 |
| 63-18423 | 5/1988 | Japan . | |
| 63-287522 | 11/1988 | Japan | 55/DIG. 5 |
| 1-058318 | 3/1989 | Japan | 55/DIG. 5 |
| 01-101615 | 7/1989 | Japan . | |
| 3-267634 | 11/1991 | Japan | 55/502 |
| 1542425 | 3/1979 | United Kingdom | 55/502 |
| WO91/19898 | 12/1991 | WIPO | 55/DIG. 5 |

Primary Examiner—Robert Spitzer
Attorney, Agent, or Firm—Palmatier, Sjoquist, Helget & Voight, P.A.

[57] ABSTRACT

A filter element for an air cleaner including a sheet-like filter medium for purifying air when the air is transferred from one side to the other side of the filter medium, a frame member having a flange confining the filter medium and a side wall formed on the flange, and a fibrous mat having cushioning effect. The filter medium is folded in a sawtooth-shaped pattern and extends along a plane. The filter medium has a base contour contained in the plane and has a sawtooth-shaped peripheral edge section extending along a part of the base contour. The flange outwardly projects from the frame. The side wall is airtightly bonded to the sawtooth-shaped peripheral edge section of the filter medium. The mat continuously extends along the base contour and is fixedly bonded to a surface of the flange facing the other side of the filter medium.

7 Claims, 7 Drawing Sheets

FILTER ELEMENT FOR AIR CLEANER AND METHOD OF MANUFACTURING THE SAME

BACKGROUND OF THE INVENTION

1. Field of the Invention

The present invention relates to a filter element to be incorporated into an air cleaner which filtrates or purifies air to be sucked into an internal combustion engine, and also relates to a method of manufacturing such a filter element.

2. Description of the Prior Art

Figure 13:
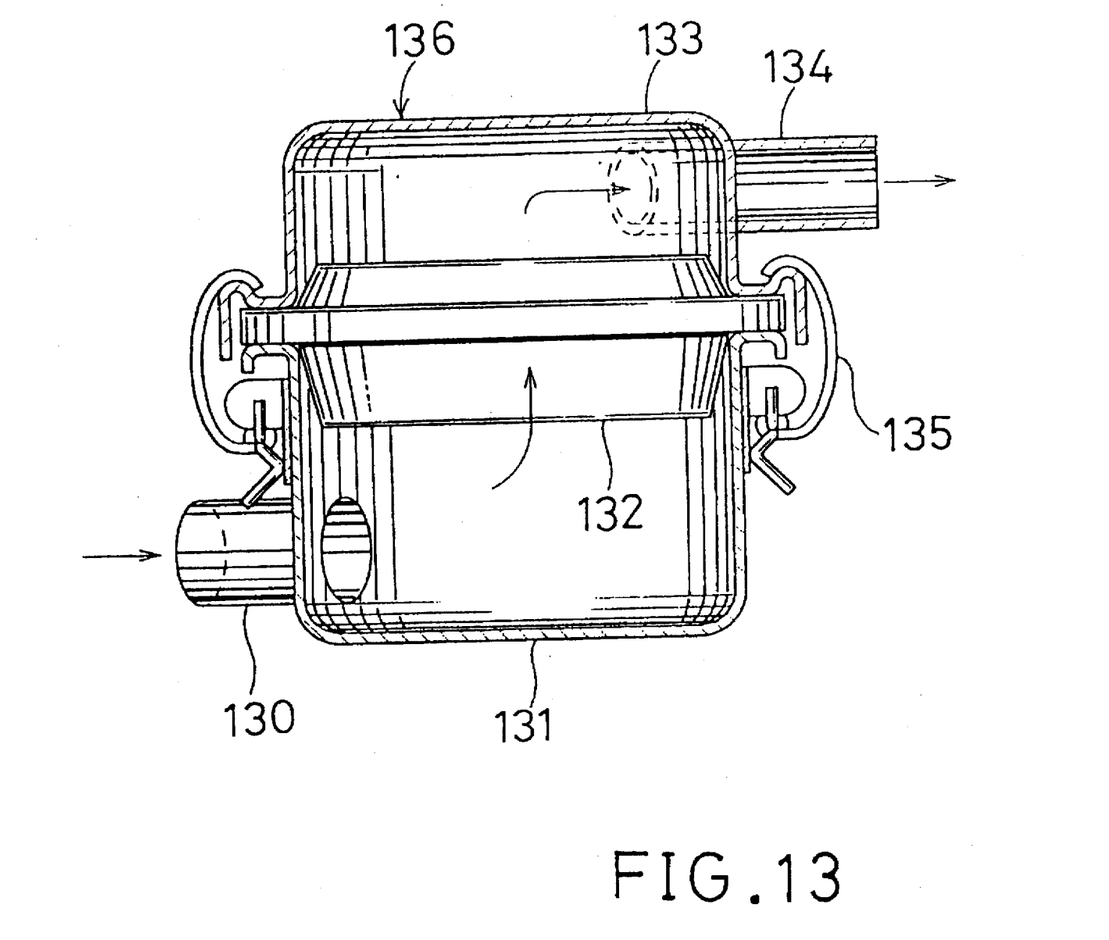
FIG. 13 is a mid-sectional view of a conventional air cleaner.

A conventional air cleaner is found in, for example, Japanese Utility Model Publication No. 63-18423. As shown in FIG. 13, the prior art air cleaner 136 is mainly constituted of a lower case 131, an upper case 133, and a filter element 132 arranged between the cases 131 and 133. The lower case 131 and the upper case 133 are provided with an air intake pipe 130 and an air outlet pipe 134 extending therefrom, respectively. The air outlet pipe 134 is connected to an engine (not shown). Air sucked through the intake pipe 130 passes through the filter element 132 and enters the engine through the air outlet pipe 134 when the engine is in an operative condition. As will be appreciated, the air is purified as it passes through the filter element 132. Further, the upper case 133 is detachably combined with the lower case 131 by clamps 135 to facilitate disassembly of the air cleaner 136 so as to replace the filter element 132 with a new one.

Figure 11:
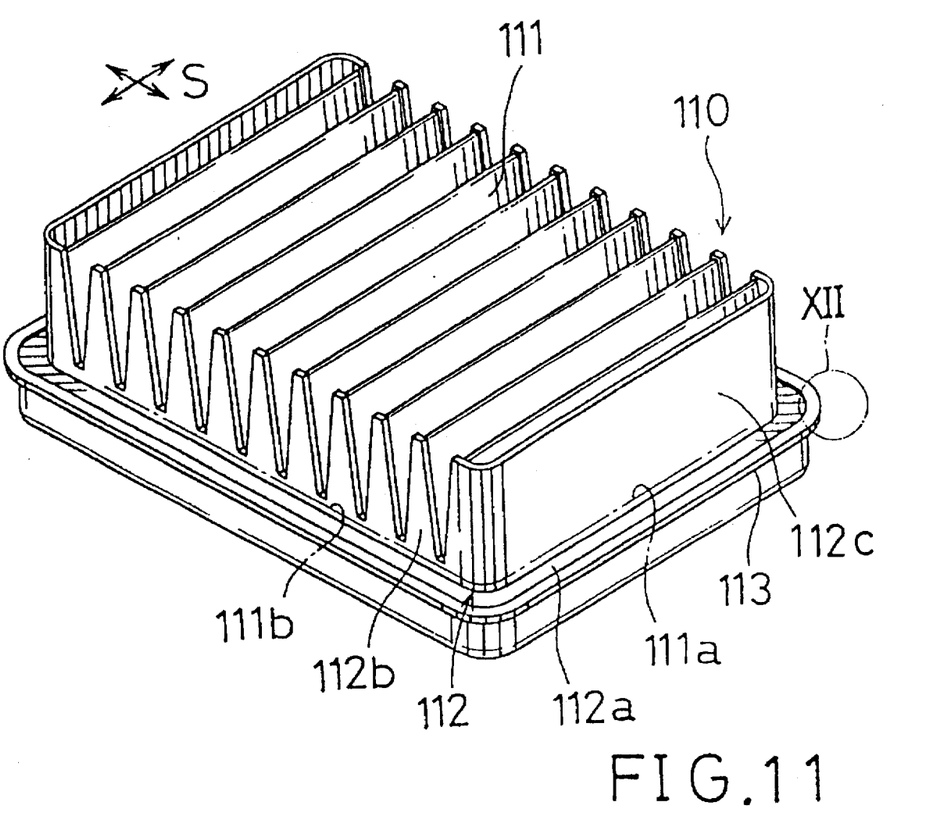
FIG. 11 is a perspective view of a conventional filter element.

A conventional filter element is found in, for example, Japanese Laid-Open Utility Model Publication No. 1-101615. As shown in FIG. 11, the prior art filter element 110 includes a filter medium 111, a rectangular frame member 112 and a cushioning member 113 made of a synthetic elastomeric resin. The filter medium 111 is made of a sheet-like material which is folded in a sawtooth-shaped pattern to maximize the total surface area thereof. The filter medium 111 extends along a plane S and has a substantially rectangular base contour 111a which is contained in the plane S. As will be appreciated, the filter medium 111 has opposed sawtooth-shaped edge sections extending along opposed base contour sections 111b of the base contour 111a. Air is filtrated or purified when the air is transferred from one side of the plane S (the upper side in the drawing) to the other side of the plane S (the lower side in the drawing).

Figure 12:
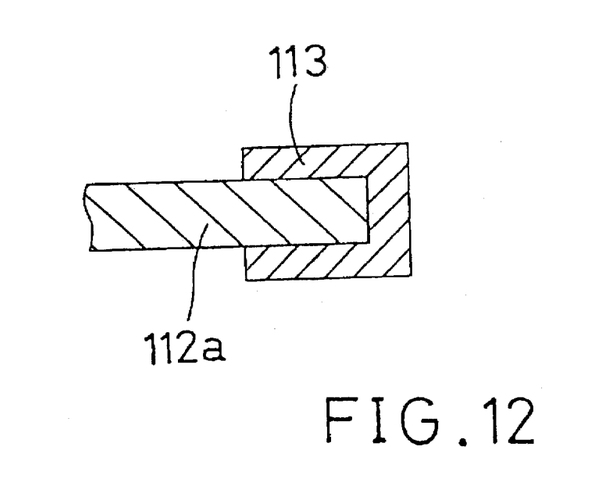
FIG. 12 is an enlarged sectional view of a portion indicated by a circled line XII in FIG. 11.

The filter medium 111 is incorporated into the frame member 112. The frame member 112 includes a flange 112a outwardly integrally projecting therefrom and two pairs of opposed vertical walls 112b and 112c integrally formed on the flange 112a. The flange 112a confines the base contour 111a of the filter medium 111. The walls 112b extends along the base contour sections 111b of the base contour 111a and is airtightly bonded to the sawtooth-shaped peripheral edge sections of the filter medium 111. Further, the walls 112b have sawtooth-shaped configuration so as to conform to the sawtooth-shaped peripheral edge sections of the filter medium 111. As best shown in FIG. 12, the cushioning member 113 is circumferentially provided on the peripheral edge of the flange 112a so as to cover the upper surface, the end edge and the lower surface of the flange 112a.

When the filter element 110 thus constructed is applied to the air cleaner 136 shown in FIG. 13, the cushioning member 113 may act as a gasket to provide excellent airtight seals between the filter element 110 and the upper case 133 and between the filter element 110 and the lower case 131 for effectively preventing entrance of the nonpurified air into the upper case 133 through the spaces between the upper case 133 and the lower case 131 since the cushioning member 113 is made of the synthetic elastomeric resin which exhibits resistivity to air transmission and good deformability. As will be easily understood, if the filter element 110 does not have the cushioning member 113 provided on the flange 112a, the air introduced into the engine may contain nonpurified air which is sucked through spaces between the upper case 133 and the lower case 131.

A described above, the filter element 110 shown in FIGS. 11 and 12 uses the cushioning member 113 made of the synthetic elastomeric resin. The cushioning member 113 has to exhibit suitable elasticity for a long time in an engine room of which the temperature environment is vigorously changed. Thus, the cushioning member 113 has to be made of a high quality synthetic elastomeric resin. This may lead to increased cost of the filter element 110. Additionally, the filter element 110 is not suitable for reuse since the cushioning member 113 is made of the synthetic elastomeric resin different from a material for the frame member 112.

It is an object of the invention to provide a filter element which can be manufactured at relatively low cost.

It is another object of the invention to provide a filter element which is suitable for reuse.

SUMMARY OF THE INVENTION

The present invention intends to improve a construction of a filter element so that nonpurified air is not sucked through spaces between an upper case and a lower case.

Conventionally, a sealing member or cushioning member made of an elastomeric material having resistivity to air transmission has been used to prevent the suction of the nonpurified air. However, such an elastomeric material is relatively expensive.

Unlike conventional conception, the present invention uses a fibrous mat having air-permeability and cushioning effect. The fibrous mat cannot sufficiently prevent suction of air through the spaces between the upper and lower cases because of air-permeability thereof. However, the fibrous mat may purify the air passed therethrough since the fibrous mat may act as a filter medium. Thus, the present invention may eliminate the problem of suction of nonpurified air since the air sucked through the space between the upper and lower cases is sufficiently purified.

Additionally, the fibrous mat is very inexpensive than the elastomeric material having resistivity to air transmission. For example, it has been found that a manufacturing cost of the filter element falls to 40% if the fibrous mat is used in place of the sealing member made of a synthetic elastomeric resin.

The mat is bonded to a frame member of the filter element by adhesion or welding. More preferably, the mat is bonded to a flange of the frame member as an insert during injection molding of the frame member. In the latter case, it is difficult to retain the mat in a desired position in a molding die since the mat is affected by molten resin fed into the molding die. Further, the mat loses cushioning effect by permeation of the molten resin thereinto. In the present invention, the flange is constituted of a plurality of ribs to eliminate these drawbacks. The mat is retained to the desired position in the molding die during injection molding since the ribs may effectively prevent moving of the mat in the molding die. Additionally, the mat may keep required cushioning effect since the mat is not permeated with the resin at each area between the ribs.

The present invention will become more fully apparent from the claims and the description as it proceeds in connection with the drawings.

DETAILED DESCRIPTION OF THE PREFERRED EMBODIMENTS

A preferred embodiment of the present invention will now be described in detail with reference to FIGS. 1 to 5.

Figure 1:
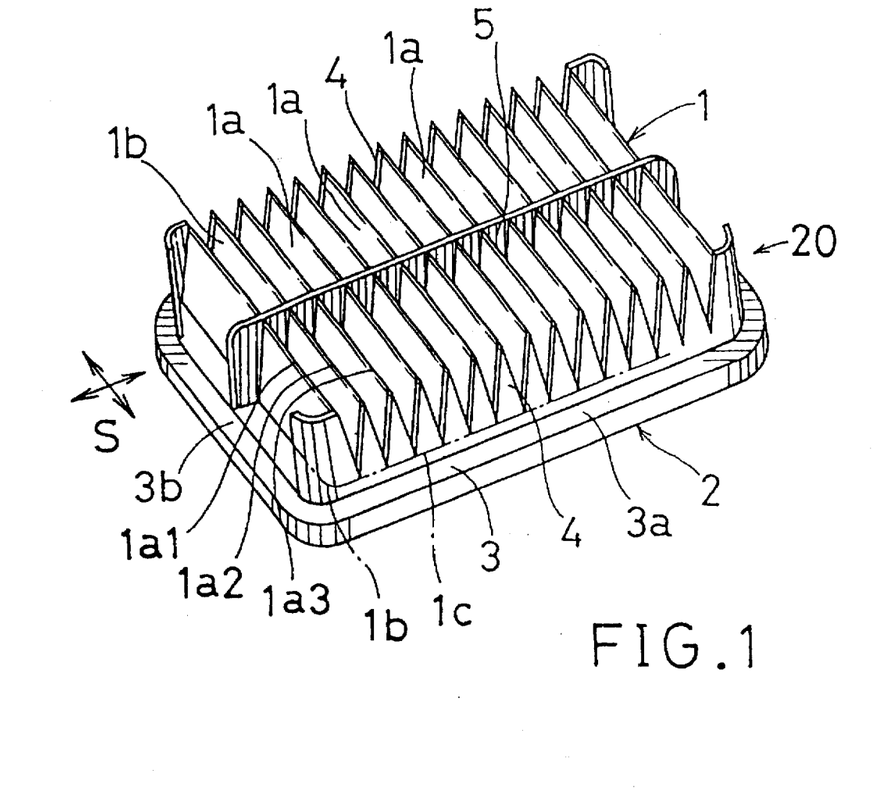
FIG. 1 is a perspective view of a filter element for an air cleaner according to an embodiment of the present invention.
Figure 2:
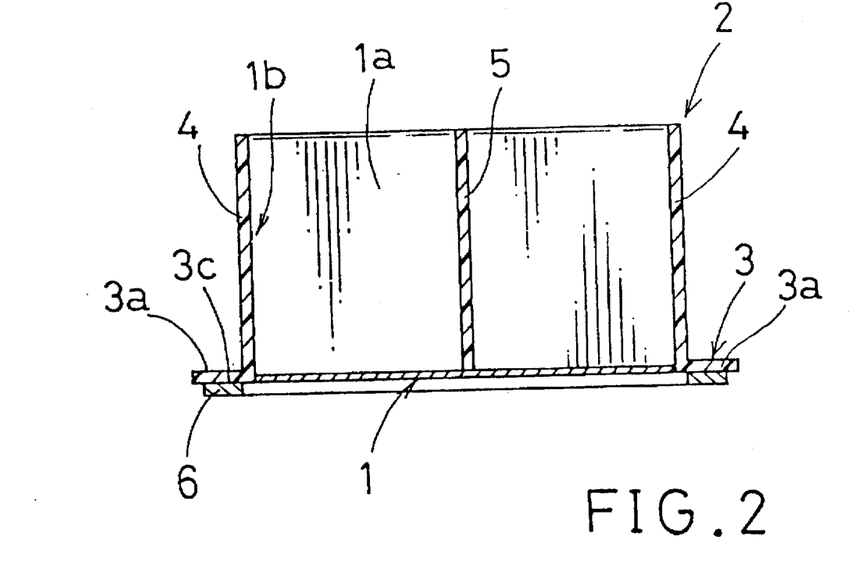
FIG. 2 is a transversely sectional view of the filter element.
Figure 3:
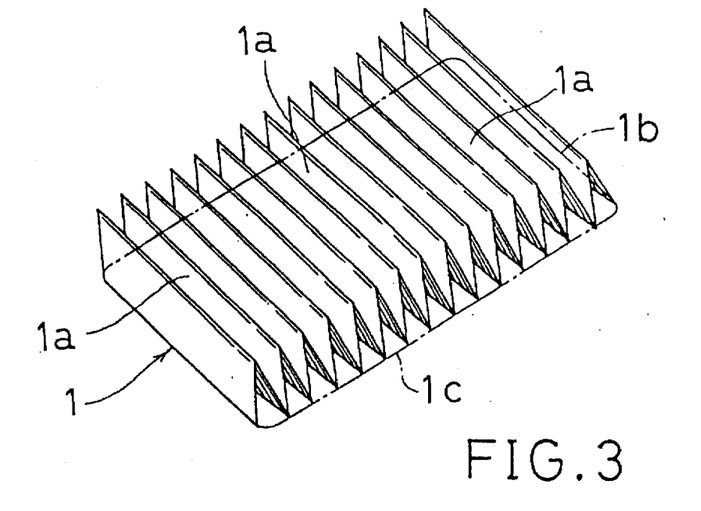
FIG. 3 is a perspective view of a filter medium used in the filter element.

In a filter element 20 to be incorporated into an air cleaner (not shown) which filtrates or purifies air to be introduced into an internal combustion engine (not shown), a filter medium 1 for filtrating dust is made of a sheet-like fibrous material such as a nonwoven fabric which is folded in a sawtooth-shaped pattern. As a result, the filter medium 1 includes a plurality of folds 1a arranged in parallel and labeled with reference numbers such as 1a1, 1a2 and 1a3. The filter medium 1 extends along a plane S and has a substantially rectangular base contour 1b contained in the plane S and including opposed base contour sections 1c. As will be appreciated, the filter medium 1 has opposed sawtooth-shaped peripheral edge sections extending along the base contour sections 1c. The filter medium 1 has air-permeable properties and may effectively filtrate the dust.

The filter medium 1 is incorporated in a rectangular frame member 2. The frame member 2 is molded by injection molding of a synthetic thermoplastic resin such as polypropylene. The frame member 2 includes an annular flange 3 outwardly integrally projecting therefrom and a pair of opposed vertical side walls 4 integrally formed on the annular flange 3. The annular flange 3 confines the filter medium 1 and is constituted of a pair of opposed flange sections 3a extending along the row of the folds 1a of the filter medium 1 and a pair of opposed flange sections 3b extending longitudinally along the folds 1a. The vertical side walls 4 extend along the flange sections 3a and are arranged in parallel with the folds 1a of the filter medium 1 held therebetween. Further, the side walls 4 have sawtooth-shaped configuration so as to substantially conform to the sawtooth-shaped peripheral edge sections of the filter medium 1.

The outer base perimeter or base contour 1b of the filter medium 1 is embedded in and bonded to the inner circumferential surface of the frame member 2. Moreover, the sawtooth-shaped peripheral edge sections of the filter medium 1 are also embedded in and bonded to the inner surfaces of the side walls 4.

The frame member 2 is provided with a central reinforcement wall 5 extending parallel with the side walls 4. The reinforcement wall 5 is made of the synthetic thermoplastic resin and is integrally formed on the frame member 2 during extrusion molding of the frame member 2. As will be easily understood, the reinforcement wall 5 has a series of sawtooth-shaped notches to receive the sawtooth-shaped folds 1a of the filter medium 1.

Figure 4:
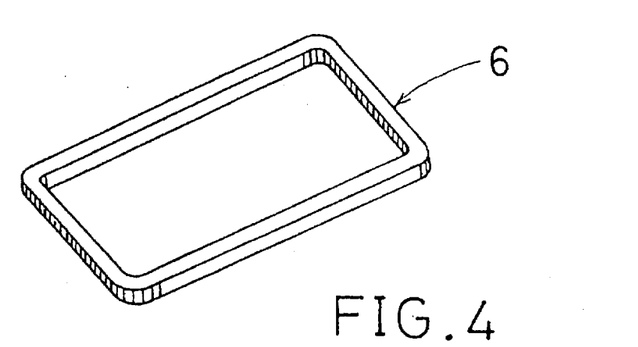
FIG. 4 is a perspective view of a mat used in the filter element.

The flange 3 includes an annular fibrous mat 6 provided on the underside surface 3c thereof and extending along the entire length thereof. The mat 6 is formed of an air-permeable fibrous material such as a nonwoven fabric which may exhibit cushioning effect. The mat 6 is compressively forced to a sealing surface of an air cleaner housing (not shown) when the filter element 20 is mounted on the air cleaner housing.

The mat 6 is bonded to the flange 3 by adhesion, welding, ultrasonic welding and the like after completion of molding of the frame member 2 and the reinforcement wall 5.

Figure 5:
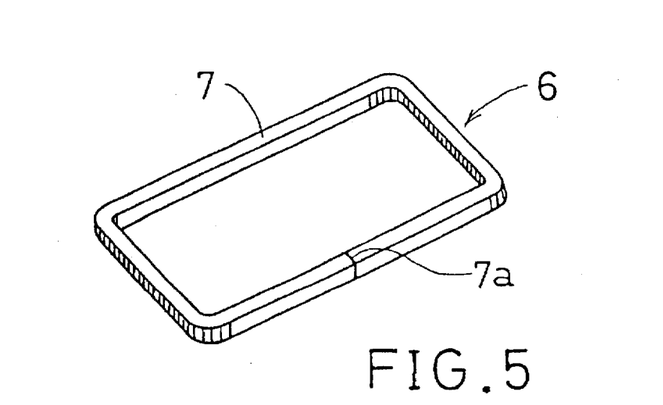
FIG. 5 is a perspective view of the mat in a modified form.

Although the mat 6 is formed generally by stamping of a sheet-like fibrous material, as shown in FIG. 4, the mat 6 can be formed by bonding opposed ends 7a of a looped band-like fibrous material 7, as shown in FIG. 5.

The filter medium 1 and the mat 6 is formed preferably of a fibrous material made of a synthetic resin similar to a synthetic thermoplastic resin for making the frame member 2 and the reinforcement wall 5.

In the preferred embodiment described above, the frame member 2 is combined with the filter medium 1 in such a way that the filter medium 1 is confined within the frame member 2 and that the folds 1a of the filter medium 1 are held between the vertical side walls 4. Thus, the filter medium 1 may have increased self-sustainablity and resistivity to negative pressure. Also, the filter element 20 can be stably supported in the air cleaner housing. Additionally, the mat 6 may act as a sealant to seal around the filter medium 1. This may eliminate the need for the cushioning member made of the synthetic elastomeric resin which is used in the conventional filter element, thereby reducing the manufacturing cost of the filter element.

A process for manufacturing the filter element 20 will now be explained.

The filter medium 1 previously formed of the fibrous material and having the folds 1a is first placed in a molding die of an injection molding machine as an insert. Thereafter, the synthetic resin is injected in the molding die to integrally mold the frame member 2 including the annular flange 3 and the vertical side walls 4 and the reinforcement wall 5, thereby producing a molded product with the filter medium 1 in which the base contour 1b and the sawtooth-shaped peripheral edge sections of the filter medium 1 are embedded in and bonded to the inner circumferential surface of the frame member 2 and the inner surfaces of the side walls 4, respectively.

After completion of the molding of the frame member 2, the molded product with the filter medium 1 thus produced is removed from the molding die. Subsequently, the annular mat 6 previously formed is bonded to the underside surface 3c of the flange 3 by adhesion, welding, ultrasonic welding and the like, thereby producing the filter element 20.

Further, the mat 6 can be bonded to the flange 3 during injection molding of the frame member 2 and the reinforcement wall 5.

Figure 8:
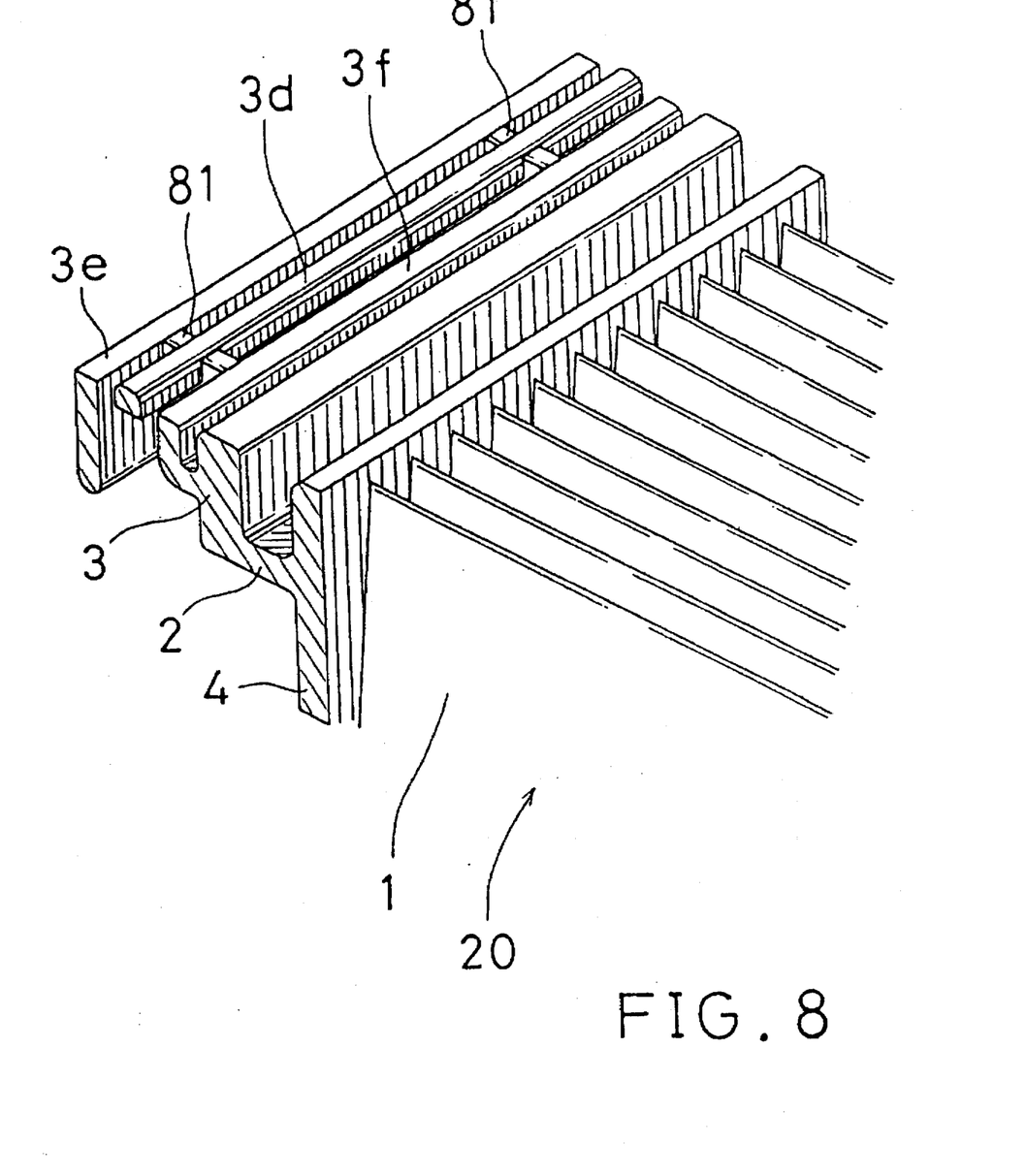
FIG. 8 is an enlarged perspective view of a flange of the filter element as viewed from the lower side.

In such a case, the frame member 2 is modified in a manner which will be hereinafter described. As shown in FIG. 8 viewed from the lower side of the filter element 20, the flange 3 of the frame 2 is mainly constituted of an annular central rib 3d, an annular outer rib 3e and an annular inner rib 3f which are arranged in transversely spaced relationship, and includes a plurality of connecting blocks 81 which interconnect the ribs 3d, 3e and 3f.

A process for manufacturing the filter element 20 having the modified frame 2 will be explained.

The filter medium 1 and the mat 6 previously formed are located as inserts in a molding die (which will be described hereinafter in detail) of an injection molding machine. Thereafter, the synthetic resin is injected in the molding die to integrally mold the frame member 2 including the annular flange 3 and the vertical side walls 4 and the reinforcement wall 5, thereby producing the filter element 20. In the filter element 20 thus constructed, the base contour 1b and the sawtooth-shaped peripheral edge sections of the of the filter medium 1 are embedded in and bonded to the inner circumferential surface of the frame member 2 and the inner surfaces of the side walls 4, respectively. The filter medium 1 is also embedded in and bonded to the reinforcement wall 5. Further, the mat 6 is simultaneously embedded in and bonded to the underside surface 3c of the flange 3.

Figure 6:
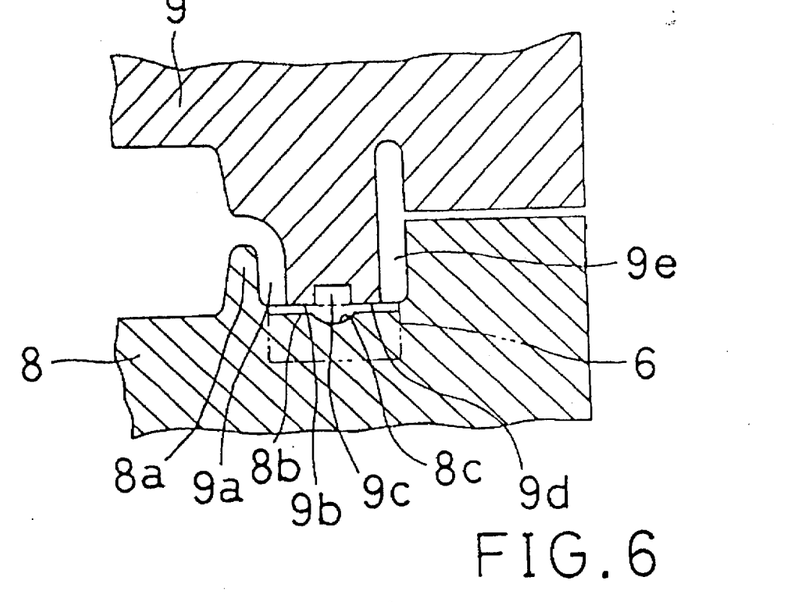
FIG. 6 is a transversely fragmentary sectional view of a die used in the present invention.

As shown in FIG. 6, the molding die includes a lower die part 8 and an upper die part 9 which may relatively be moved to close and open the molding die. The lower die part 8 has an annular projection 8a along which the mat 6 is to be located. On the other hand, the upper die part 9 is machined so that three laterally spaced grooves 9a, 9c and 9e extending along the annular projection 8a are formed between the lower and upper die parts 8 and 9 when the molding die is closed. Further, the upper die part 9 is also machined so that these grooves 9a, 9c and 9e partially communicate with each other. Additionally, the lower die part 8 is formed with a shallow groove 8c opposed to the groove 9c.

The filter medium 1 and the mat 6 previously formed are placed in the molding die as inserts in which the mat 6 is arranged along the annular projection 8a on the lower die part 8. Thereafter, the lower and upper die parts 8 and 9 are relatively moved to close the molding die, thereby forming the grooves 9a, 9c and 9e extending along the mat 6. As will be easily understood, when the molding die is closed, the mat 6 is compressed between the upper surface 8b of the lower die part 8 and the lower surfaces 9b and 9d of the upper die part 9 so as to be fixedly positioned thereto and to prevent permeation of the resin.

Figure 7:
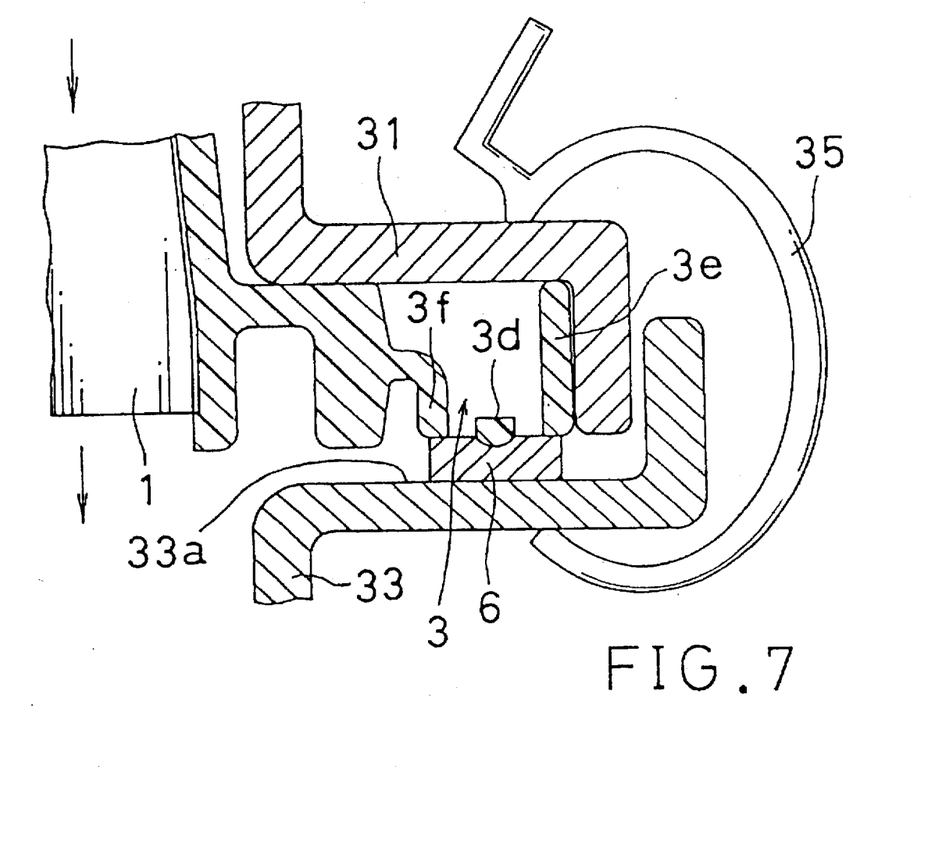
FIG. 7 is a transversely fragmentary sectional view of the filter element manufactured by utilizing the die shown in FIG. 6.

In this condition, the synthetic resin is injected into the molding die. The resin is successively filled in the grooves without permeating into the mat 6 and moving the mat 6, thereby forming the ribs 3d, 3e and 3f of the flange 3. Further, the resin introduced into the groove 9c may slightly press the mat 6 so that the rib 3d is projected into the mat 6, as shown in FIG. 7, since the lower die part 8 includes the shallow groove 8c opposed to the groove 9c of the upper die part 9.

The central rib 3d may locally increase the biasing force of the mat 6 against the sealing surface of the air cleaner housing when the filter element 20 is fixed on the air cleaner housing, thereby increasing the sealing pressure between the mat 6 and the sealing surface of the air cleaner housing.

In the process for manufacturing the filter element 20 having the modified frame 2, the mat 6 is preferably formed of a synthetic fibrous material made of a synthetic resin, for example, a polyester resin and a non-thermoplastic resin, which has melting point higher than the temperature of the molten resin for extrusion molding and the temperature of the molding die. Further, the mat 6 is preferably formed of a synthetic resin similar to the resin for the frame member 2 and the reinforcement wall 5, for facilitating reuse of the filter element 20.

In general, permeation of the molten resin into the mat 6 causes reduction of cushioning effect of the mat 6. However, in the construction of the flange 3 shown in FIGS. 7 and 8, the mat 6 keeps enough cushioning effect since the resin is never permeated into the mat 6 between the rib 3d and the rib 3e and between the rib 3d and the rib 3f. The filter element 20 having the modified frame 2 is located between an upper case 31 and a lower case 33 and the surface 33a of detachably fixed by clamps 35, as shown in FIG. 7. Further, in FIG. 7, the filter element 20 is shown upside down of an actual position in use.

Figure 9:
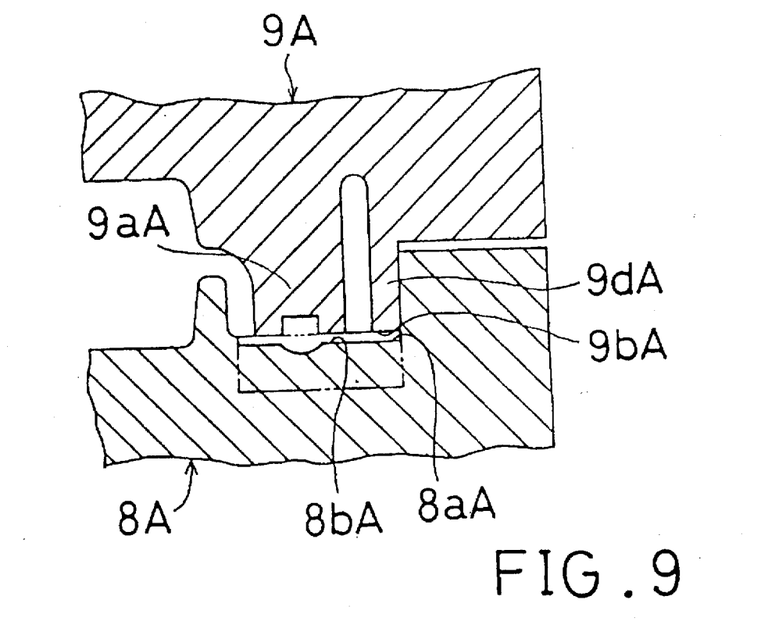
FIG. 9 is a transversely fragmentary sectional view of the die in a modified form.
Figure 10:
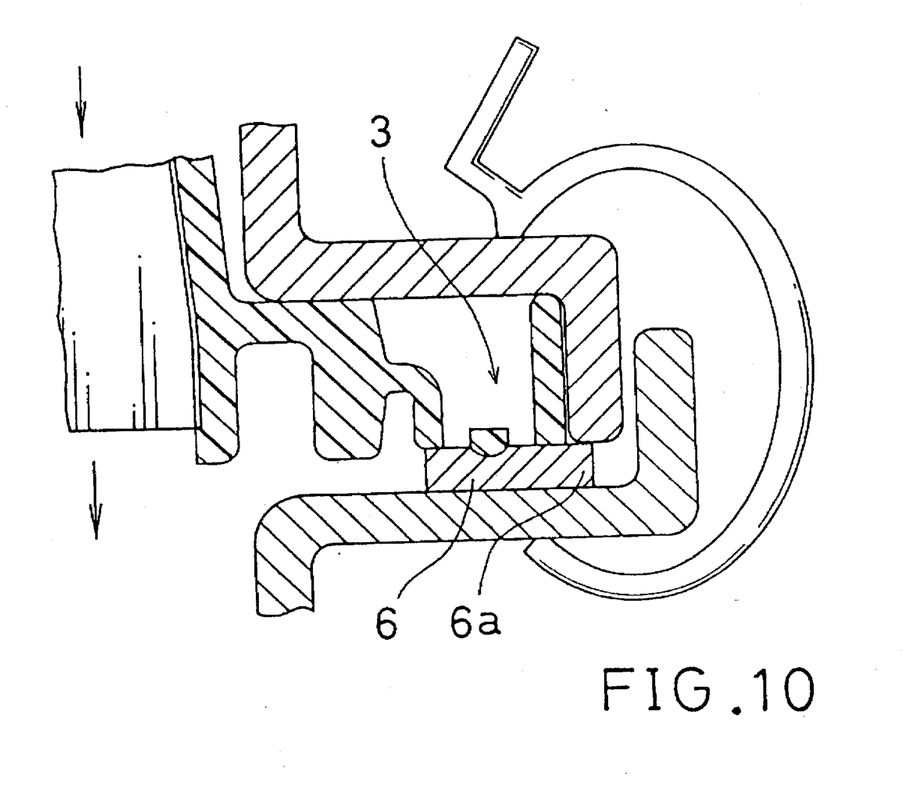
FIG. 10 is a transversely fragmentary sectional view of the filter element manufactured by utilizing the die shown in FIG. 9.

Alternatively, as shown in FIG. 9, the molding die can be modified. The modified molding die includes a lower die part 8A having a concave portion 8bA and an upper die part 9A having a convex portion 9aA. The upper die part 9A is provided with an annular outermost wall 9dA having a lower surface 9bA corresponding to an annular outermost surface 8aA of the lower die part 8A so that the mat 6 is additionally compressed at the periphery when the molding die is closed. Consequently, as shown in FIG. 10, the mat 6 has a circumferential edge 6a extending along the entire length of the flange 3 and outwardly projecting from the peripheral edge of the flange 3.

The circumferential edge 6a may further prevent reduction of cushioning effect of the mat 6 caused by permeation of the resin since the resin is not permeated into the circumferential edge 6a.

Of course, the molding die can be modified in such a way that the mat 6 has an annular end portion inwardly projecting from the peripheral edge of the flange 3. Further, the molding die can be modified in such a way that the mat 6 has annular end portions outwardly and inwardly projecting from the peripheral edges Of the flange 3.

Moreover, the filter medium 1 may have a pair of end covers formed of a fibrous material same as that for the filter medium 1 so as to close the sawtooth-shaped peripheral edge sections thereof. The end covers will be combined with the filter medium 1 by utilizing an adhesive agent. The end covers may increase filtration efficiency of the filter element 20 since the end covers may also exhibit filtration function. As will be appreciated, in the filter element thus designed, the vertical side walls 4 of the frame 2 is omitted.

The preferred embodiment herein described are intended to be illustrative of the invention and not to limit the invention to the precise form herein described. It is chosen and described to explain the principles of the invention and their application and practical use to enable others skilled in the art to practice the invention.

What is claimed is:

1. A filter element for an air cleaner, comprising:
    a sheet-like filter medium for purifying air when the air is transferred from one side to the other side of said filter medium, said filter medium being folded in a sawtooth-shaped pattern and extending along a plane, said filter medium having a base contour contained in the plane and having a sawtooth-shaped peripheral edge section extending along a part of said base contour;

a frame member having a flange confining said filter medium and a side wall formed on said flange, said flange outwardly projecting from said frame, said side wall being airtightly bonded to said sawtooth-shaped peripheral edge section of said filter medium; and a fibrous mat having cushioning effect, said mat continuously extending along said base contour and fixedly bonded to a surface of said flange facing the other side of said filter medium.

2. The filter element as defined in claim 1, wherein said filter medium and said mat are formed of a fibrous material made of a synthetic resin similar to a synthetic resin for said frame member.

3. The filter element as defined in claim 1, wherein said mat is fixedly bonded to said frame member as an insert when said frame member is molded.

4. The filter element as defined in claim 1, wherein said surface of said flange is provided with a projection rib extending along an entire length of said base contour.

5. The filter element as defined in claim 1, wherein said flange is mainly constituted of a plurality of ribs extending along the entire length of said base contour and a plurality of connecting blocks which partially interconnect said ribs.

6. The filter element as defined in claim 5, wherein said mat has a circumferential edge outwardly projecting from the outermost one of said ribs.

7. A method of manufacturing a filter element for an air cleaner, comprising the steps of:

providing an injection molding die having an upper die part and a lower die part;

arranging between the upper and the lower die parts a sheet-like filter medium folded in a sawtooth-shaped pattern and a fibrous mat circumferentially extending around the filter medium;

closing the injection molding die; and injecting a molten resin into the injection molding die, the upper and lower die parts cooperating to form a plurality of grooves extending along the fibrous mat when the injection molding die is closed.

* * * * *